(12) United States Patent
Chen et al.

(10) Patent No.: US 11,645,950 B2
(45) Date of Patent: May 9, 2023

(54) BIONIC HUMAN ESOPHAGUS AND GASTRIC DIGESTIVE SYSTEM

(71) Applicant: XIAODONGYIJIAN (SUZHOU) INSTRUMENTS AND EQUIPMENT CO., LTD., Suzhou (CN)

(72) Inventors: Xiaodong Chen, Auckland (NZ); Zhenkai Liao, Suzhou (CN)

(73) Assignee: XIAODONGYIJIAN (SUZHOU) INSTRUMENTS AND EQUIPMENT CO., LTD., Suzhou (CN)

( * ) Notice: Subject to any disclaimer, the term of this patent is extended or adjusted under 35 U.S.C. 154(b) by 425 days.

(21) Appl. No.: 17/048,729

(22) PCT Filed: Dec. 6, 2018

(86) PCT No.: PCT/CN2018/119444
§ 371 (c)(1),
(2) Date: Oct. 19, 2020

(87) PCT Pub. No.: WO2020/034495
PCT Pub. Date: Feb. 20, 2020

(65) Prior Publication Data
US 2021/0174707 A1 Jun. 10, 2021

(30) Foreign Application Priority Data
Aug. 14, 2018 (CN) .......................... 201810920433.7

(51) Int. Cl.
*G09B 23/32* (2006.01)
*G09B 23/30* (2006.01)

(52) U.S. Cl.
CPC ........... *G09B 23/32* (2013.01); *G09B 23/303* (2013.01)

(58) Field of Classification Search
CPC ....... G09B 23/28; G09B 23/30; G09B 23/303
See application file for complete search history.

(56) References Cited

U.S. PATENT DOCUMENTS 5,525,305 A * 6/1996 Minekus ................ B01F 31/55
422/111
5,993,406 A * 11/1999 Rozga .................... G09B 23/28
604/6.09

(Continued)

FOREIGN PATENT DOCUMENTS

CN 101000723 A 7/2007
CN 102313795 A 1/2012

(Continued)

*Primary Examiner* — Kurt Fernstrom
(74) *Attorney, Agent, or Firm* — SZDC Law PC

(57) ABSTRACT

The invention discloses a bionic human esophagus and stomach digestive system including a bionic stomach assembly and a bionic esophagus assembly. The bionic stomach assembly includes a bionic stomach including a stomach body provided with a pylorus and a cardia, a rolling compression apparatus disposed outside the stomach body for performing rolling compression on the bionic stomach, and a gastric juice tube in fluid communication with the stomach body. The bionic esophagus assembly includes a bionic esophagus in fluid communication with the cardia, a first and second esophagus clamp which are respectively clamped at two ends of the bionic esophagus for controlling the esophagus to be opened or closed, and a vibrator disposed between the first and second esophagus clamps for driving the bionic esophagus to vibrate. In the application, the bionic stomach and esophagus are subject to mechanical compression and vibration, thereby simulating a real stomach digestive system.

10 Claims, 4 Drawing Sheets

(56) References Cited

U.S. PATENT DOCUMENTS

| | | | | |
|---|---|---|---|---|
| 6,022,733 | A * | 2/2000 | Tam | C12M 29/16 |
| | | | | 435/298.2 |
| 8,257,085 | B2 * | 9/2012 | Alric | G09B 23/32 |
| | | | | 434/272 |
| 8,435,036 | B2 * | 5/2013 | Wickham | B01F 35/7547 |
| | | | | 434/127 |
| 10,127,839 | B2 * | 11/2018 | Legen | G09B 23/303 |
| 11,557,226 | B2 * | 1/2023 | Mascart | B01J 19/0066 |
| 2005/0181342 | A1 * | 8/2005 | Toly | G09B 23/30 |
| | | | | 434/262 |
| 2010/0256667 | A1 * | 10/2010 | Ashby | A61F 5/0036 |
| | | | | 156/198 |
| 2010/0286745 | A1 | 11/2010 | Imran | |
| 2019/0228681 | A1 * | 7/2019 | Zhan | G09B 23/32 |
| 2021/0272478 | A1 * | 9/2021 | Shimoda | G09B 23/303 |

FOREIGN PATENT DOCUMENTS

| | | |
|---|---|---|
| CN | 202256305 U | 5/2012 |
| CN | 108088966 A | 5/2018 |
| CN | 108318625 A | 7/2018 |
| CN | 108735060 A | 11/2018 |

* cited by examiner

BIONIC HUMAN ESOPHAGUS AND GASTRIC DIGESTIVE SYSTEM

This application is the National Stage Application of National Stage Application of PCT/CN2018/119444, filed on Dec. 6, 2018, which claims priority to Chinese Patent Application No. 201810920433.7, filed on Aug. 14, 2018, which is incorporated by reference for all purposes as if fully set forth herein.

FIELD OF THE INVENTION

The present invention relates to the field of in vitro digestive systems, and more particularly to a bionic human esophagus and stomach digestive system.

DESCRIPTION OF THE RELATED ART

A model of an in vitro simulated digestive system is established based on bionic simulation of an in vivo digestive system, and has been widely used to evaluate physical and chemical properties of food and drugs. Currently, a prevalent in vitro digestive system is consisting of a beaker, a stirring and heating device. Food, a drug or the like is added to a beaker, a fixed amount of digestive fluid is added during heating and stirring, and sampling is performed later. The internal structure of a human stomach is complex, and a mixed and mashed state of the food and drug in the stomach can hardly be obtained through stirring only. The foregoing problem needs to be resolved urgently in this field.

SUMMARY OF THE INVENTION

A technical problem to be solved by the present invention is to provide a bionic human esophagus and stomach digestive system that can simulate the actual movement state of a human esophagus and stomach.

For the above purpose, the present invention provides the following technical solutions: a bionic human esophagus and stomach digestive system includes a bionic stomach assembly. The bionic stomach assembly comprises:

a bionic stomach having a stomach body which is provided with a pylorus and a cardia thereon;

a rolling compression apparatus, which is disposed outside the stomach body for performing rolling compression on the bionic stomach; and a gastric juice tube, which is in fluid communication with the stomach body.

In the present application, the rolling compression apparatus is configured to perform rolling compression on the bionic stomach, a digestive fluid is injected into the stomach body by the gastric juice tube, and the stomach body is subject to mechanical rolling compression, to simulate a real stomach digestive system.

Preferably, the bionic stomach assembly further includes a pylorus clamp which is clamped on the pylorus, and the pylorus clamp is configured to control the pylorus to be opened or closed.

Preferably, the pylorus clamp includes a pylorus clamp head, the pylorus clamp head includes a fixed member and a movable member respectively disposed at two sides of the pylorus, the fixed member is connected to a pull rod, and the pull rod may drive the movable member to move towards or away from the fixed member.

Preferably, the rolling compression apparatus includes a horizontally disposed sliding mechanism, there are two rolling compression apparatuses, the two rolling compression apparatuses are symmetrically disposed at two sides of the axis of symmetry of the bionic stomach, an angle between sliding mechanisms of the two rolling compression apparatuses is 0° to 10°, a retractable mechanism is provided on and slidably fits with the sliding mechanism. The sliding mechanism may drive the retractable mechanism to reciprocate between the middle of the stomach body and the pylorus, the retractable mechanism includes a movable end that is retractable relative to the stomach body, and an end portion of the movable end is connected to a roller.

Preferably, the bionic human esophagus and stomach digestive system further includes a stomach support disposed below the stomach body for supporting the stomach body.

Preferably, the bionic human esophagus and stomach digestive system further includes a bionic esophagus assembly connected to the bionic stomach assembly, and the bionic esophagus assembly includes:

a bionic esophagus, which is in fluid communication with the cardia; and a first esophagus clamp and a second esophagus clamp, which are respectively clamped at two ends of the bionic esophagus for controlling the esophagus to be opened or closed; and a vibrator, which is disposed between the first esophagus clamp and the second esophagus clamp for driving the bionic esophagus to vibrate.

Preferably, the bionic esophagus is further connected to a feeding mechanism.

Preferably, the vibrator includes a clamping plate for clamping the bionic esophagus, and the clamping plate is connected to a connecting rod which reciprocates horizontally.

Preferably, the bionic esophagus has the same mechanism as a human esophagus, and the bionic esophagus is made of an elastic material. The bionic stomach has the same mechanism as a human stomach, and the bionic stomach is made of elastic rubber.

Preferably, an inner sleeve is disposed at a connection between the bionic esophagus and the bionic stomach, the cardia is sleeved on one end of the inner sleeve, and the bionic esophagus is sleeved on the other end of the inner sleeve.

As compared with the prior art, the present invention has the following advantages: in the present application, the rolling compression apparatus is disposed outside the bionic stomach to perform rolling compression on the bionic stomach, and the gastric juice tube is configured to inject gastric juice into the bionic stomach, so that the peristalsis of a human stomach and intestines during digestion is simulated in a relatively realistic manner.

In addition, the bionic esophagus is disposed, and the vibrator is configured to vibrate the bionic esophagus, so that the status of food entering an esophagus is simulated in a relatively realistic manner.

In addition, the bionic esophagus is connected to the bionic stomach, so that the status of an object passing through a human esophagus to enter a stomach can be simulated in a relatively realistic manner.

In addition, the pylorus clamp is disposed to control discharge and an amount of discharge.

In addition, the bionic esophagus and the bionic stomach are bionically disposed according to a human body, thereby facilitating simulation of digestion and mashing in a human esophagus and stomach.

Figure 1:
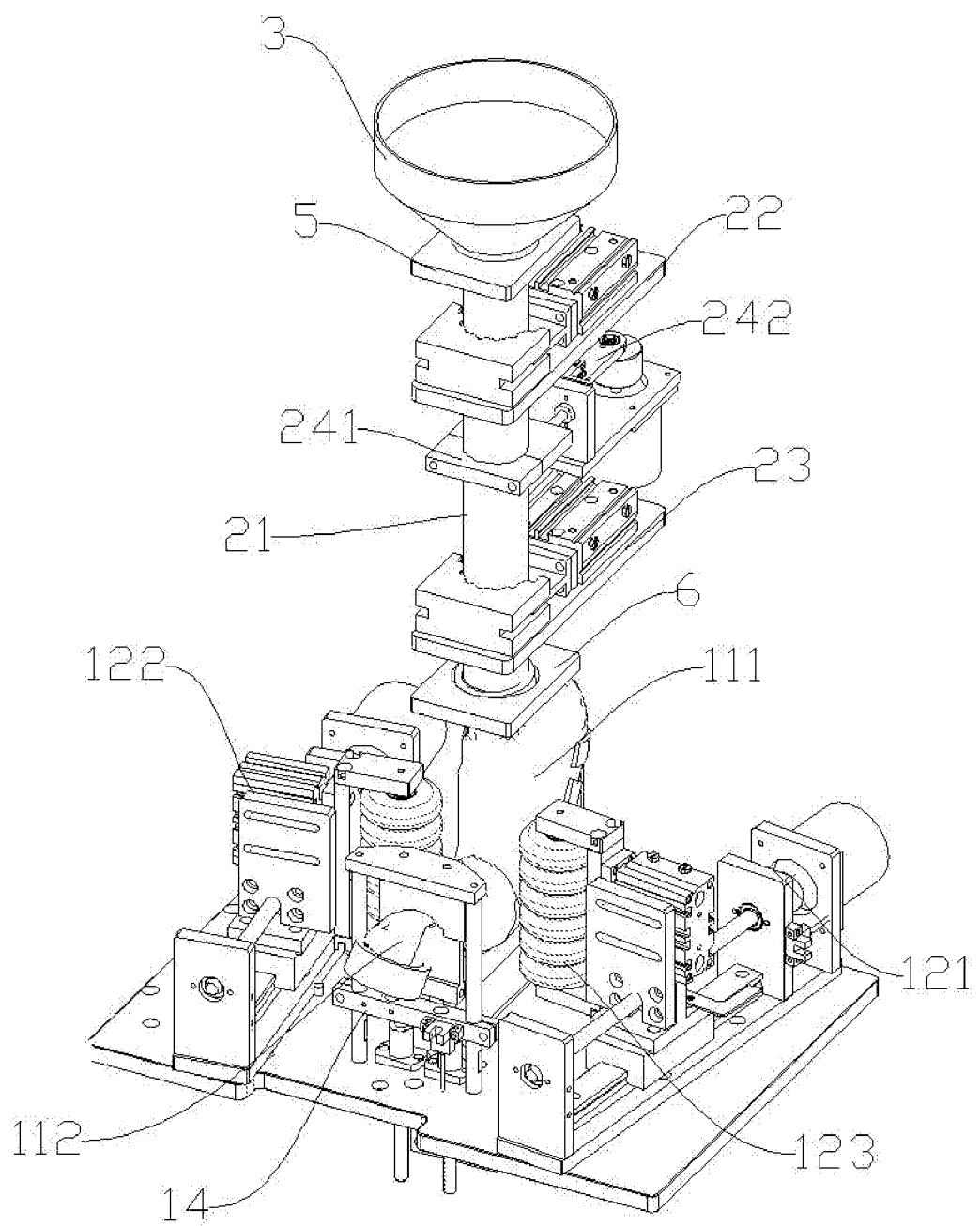
FIG. 1 is an overall three-dimensional schematic view of the present application.

Reference numerals: bionic stomach assembly 1, bionic stomach 11, a stomach body 111, pylorus 112, cardia 113, rolling compression apparatus 12, sliding mechanism 121, retractable mechanism 122, roller 123, gastric juice tube 13, pylorus clamp 14, rack 141, movable member 142, fixed member 143, pull rod 144, pinion 145, stomach support 15, bionic esophagus assembly 2, bionic esophagus 21, first esophagus clamp 22, second esophagus clamp 23, vibrator 24, clamping plate 241, connecting rod 242, feeding mechanism 3, inner sleeve 4, upper fixing clamp 5, and lower fixing clamp 6.

DETAILED DESCRIPTION OF THE PREFERRED EMBODIMENTS

The invention will be further illustrated in more detail with reference to the accompanying drawings and embodiments. It is noted that, the following embodiments only are intended for purposes of illustration, but are not intended to limit the scope of the present invention.

Figure 2:
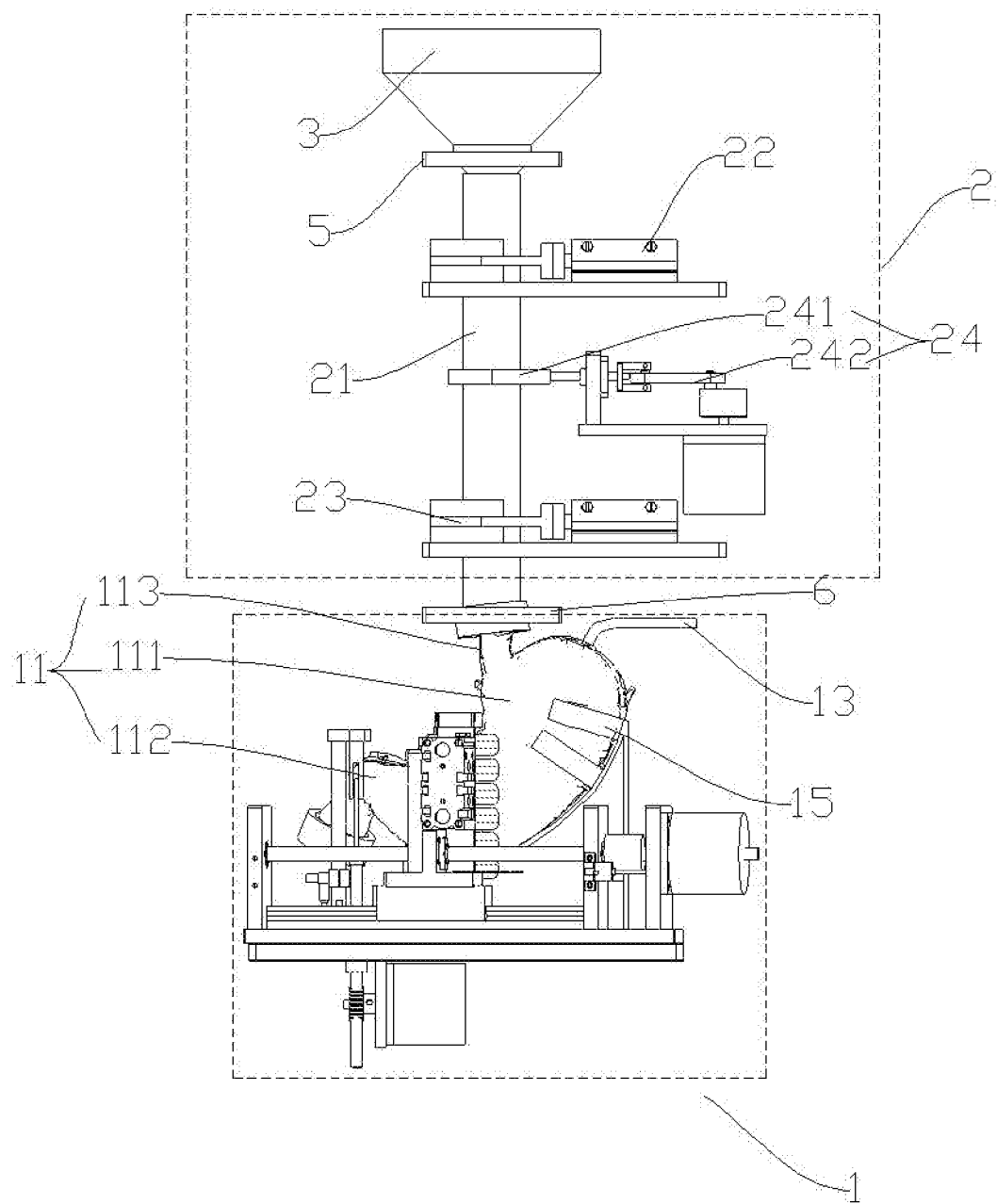
FIG. 2 is an overall side view of the present application.
Figure 3:
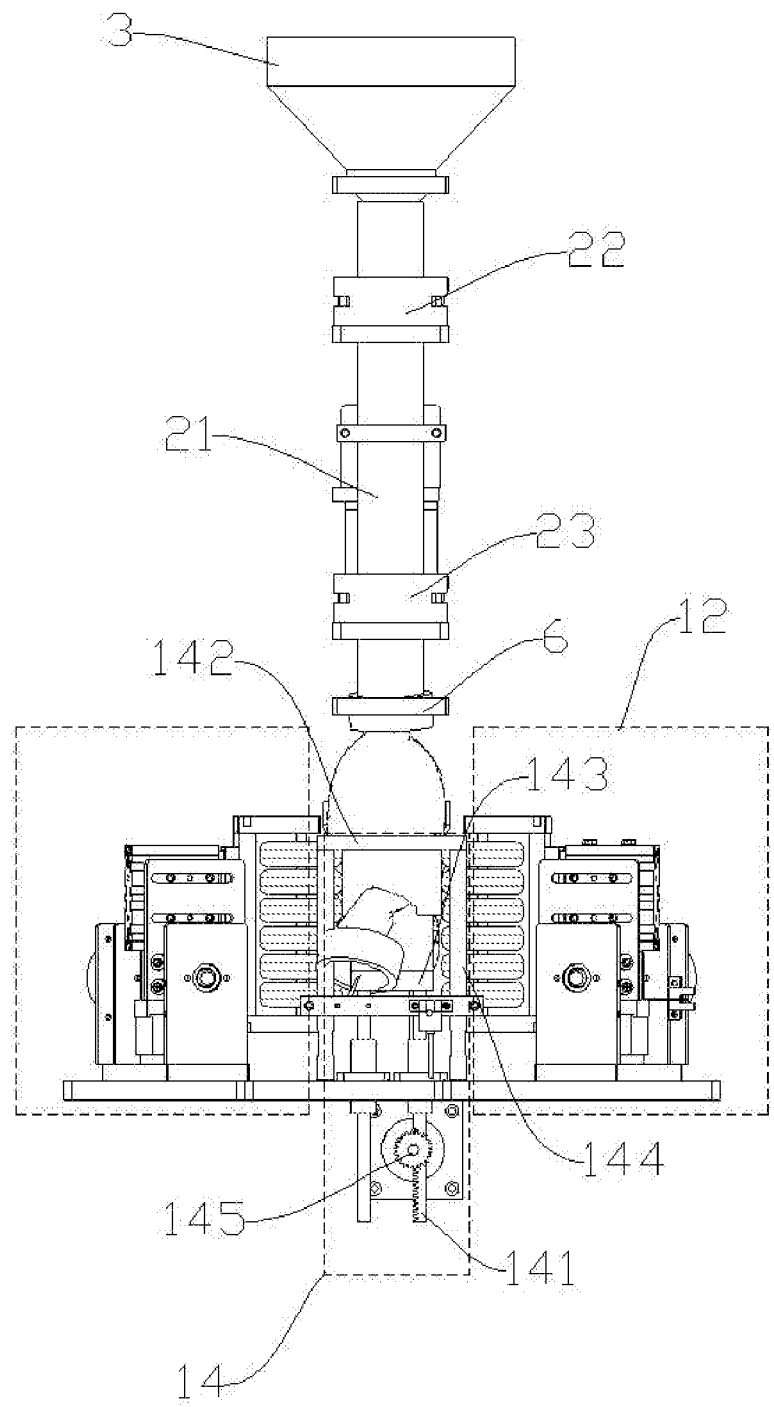
FIG. 3 is an overall front view of the present application.
Figure 4:
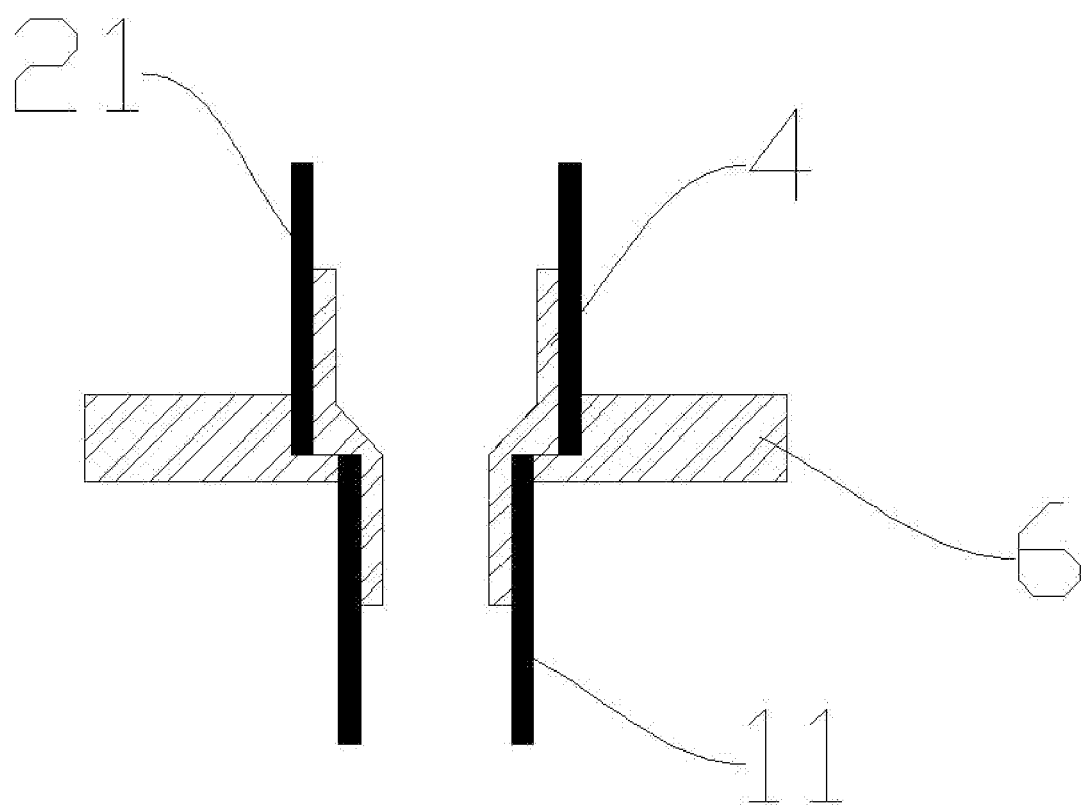
FIG. 4 is a sectional view showing a connection between a bionic stomach assembly and a bionic esophagus assembly.

As shown in FIG. 1 to FIG. 3, a bionic human esophagus and stomach digestive system includes a bionic esophagus assembly 2 and a bionic stomach assembly 1 that are in fluid communication with each other. The bionic esophagus assembly 2 is disposed above the bionic stomach assembly 1.

As shown in FIG. 1 to FIG. 3, the bionic esophagus assembly 2 includes a bionic esophagus 21, a first esophagus clamp 22, a vibrator 24, and a second esophagus clamp 23. The first esophagus clamp 22 and the second esophagus clamp 23 are respectively disposed at an upper end and a lower end of the bionic esophagus 21. The vibrator 24 is disposed between the first esophagus clamp 22 and the second esophagus clamp 23 for driving the bionic esophagus 21 to vibrate.

As shown in FIG. 1 to FIG. 3, the bionic stomach assembly 1 includes a bionic stomach 11, a stomach support 15, a gastric juice tube 13, a pylorus clamp 14, and a rolling compression apparatus 12. The bionic stomach 11 includes a stomach body 111, a cardia 113, and a pylorus 112. The cardia 113 is disposed at an upper end of the stomach body 111. The pylorus 112 is disposed at a lower end of the stomach body 111. The gastric juice tube 13 is inserted into the stomach body 111, and the gastric juice tube 13 is in fluid communication with the stomach body 111. The bionic stomach assembly 1 is mounted on a base.

As shown in FIG. 1 to FIG. 3, the bionic esophagus 21 is made by molding using a real human esophagus. In the present application, the bionic esophagus 21 has a length of 300 mm, an outer diameter of 40 mm, and an inner diameter of 30 mm. The bionic esophagus 21 is made of an elastic material, and the elastic material may be silicone or rubber.

As shown in FIG. 1 to FIG. 3, a feeding mechanism 3 is connected to an end portion of the bionic esophagus 21. In the present application, the feeding mechanism 3 is a funnel. The funnel is made of stainless steel. In the present application, the volume of the funnel is 500 ml.

As shown in FIG. 1 to FIG. 3, the spout of the funnel is inserted into the upper end of the bionic esophagus 21, and the joint is sealed by means of the elasticity of the bionic esophagus 21. An upper fixing clamp 5 is fixed outside the connection of the funnel and the bionic esophagus 21. The upper fixing clamp 5 includes two aluminum plates. A semicircular groove is respectively opened in the two aluminum plates, the two aluminum plates are connected by a screw, and the spout of the funnel is placed between the two aluminum plates to fix the funnel.

As shown in FIG. 1 to FIG. 3, the first esophagus clamp 22 is located between the upper fixing clamp 5 and the vibrator 24. The position of the vibrator is adjustable relative to the upper fixing clamp 5. The first esophagus clamp 22 includes a clamp head and a gas cylinder. The clamp head includes a fixed portion and a movable portion. The fixed portion and the movable portion are respectively disposed at two sides of the bionic esophagus 21. The movable portion is connected to the gas cylinder. In the present application, the stroke of the gas cylinder is 40 mm. The gas cylinder drives the movable portion to reciprocate to block/unblock the bionic esophagus 21. When the first esophagus clamp 22 is closed, the passage of solid, liquid and gas is blocked.

As shown in FIG. 1 to FIG. 3, the vibrator 24 is located between the first esophagus clamp 22 and the second esophagus clamp 23. Specifically, the vibrator 24 includes a clamping plate 241, a crankshaft structure, and a motor. The motor rotates to drive the crankshaft structure to reciprocate such that the clamping plate 241 is driven by the crankshaft structure to drive the bionic esophagus 21 to reciprocate. Specifically, the crankshaft structure includes a connecting rod 242. One end of the connecting rod 242 is connected to the clamping plate, and the other end of the connecting rod 242 rotatably fits with a non-axis portion of a platform surface of a circular platform. The motor drives the circular platform to rotate around the axis of the circular platform, to drive an end portion of the connecting rod 242 to rotate around the axis of the circular platform. Because the connecting rod 242 is rotatably fits with the platform surface of the circular platform, the connecting rod 242 generally makes a repeated movement along an elliptical trajectory. The amplitude of the vibrator 24 may be adjusted as required. In the present application, the amplitude of the vibrator 24 is 5 mm to 15 mm. In another embodiment, the clamping plate may also be connected to the connecting rod 242 via a linear driving mechanism such as a gas cylinder or an oil cylinder. The linear driving mechanism drives the connecting rod 242 to linearly reciprocate to drive the bionic esophagus 21 to vibrate.

As shown in FIG. 1 to FIG. 3, the second esophagus clamp 23 is located between the vibrator 24 and a lower fixing clamp 6. The second esophagus clamp 23 has the same the structural principle as the first esophagus clamp 22.

As shown in FIG. 1 to FIG. 4, the lower fixing clamp 6 is located at a connection of the bionic esophagus assembly 2 and the bionic stomach assembly 1. The lower fixing clamp 6 has the same structural principle as the upper fixing clamp 5. An inner sleeve 4 is disposed at a connection of the bionic esophagus 21 and the bionic stomach 11. The cardia 113 is sleeved on one end of the inner sleeve 4, and the bionic esophagus 21 is sleeved on the other end of the inner sleeve 4. The lower fixing clamp 6 is configured to clamp and fix the inner sleeve 4, to fixedly connect the bionic esophagus assembly 2 and the bionic stomach assembly 1. The inner sleeve 4 is disposed to support the cardia 113 and the lower end of the bionic esophagus 21, so that the bionic stomach 11 and the bionic esophagus 21 can be prevented from deformation during fixation. The inner sleeve 4 may be a metal tube.

As shown in FIG. 1 to FIG. 3, the bionic stomach 11 is made of an elastic material by molding using a real human stomach. The elastic material may be silicone or rubber.

As shown in FIG. 1 to FIG. 3, the stomach support 15 is mounted on a substrate below the stomach body. The stomach support 15 generally has an arc shape structure bending upward. The stomach support 15 is generally body-fitted against the lower part of the stomach body (stomach "organ" model). The inner arc surface of the stomach support 15 fits the stomach body. The stomach support 15 is configured to support the stomach body 111 of the bionic stomach 11, to prevent the stomach body 111 from sagging due to excessively heavy food.

As shown in FIG. 1 to FIG. 3, the pylorus clamp 14 is located at the pylorus 112 which is at a turning tail end of the bionic stomach 11. The pylorus clamp 14 can block the passage of gas, liquid, and solid. Specifically, the pylorus clamp 14 includes a motor, a pinion 145, a rack 141, a pull rod 144, and a pylorus clamp head. The pylorus clamp head includes a fixed member 143 and a movable member 142 which are respectively mounted at an upper side and a lower side of the pylorus 112. The motor is disposed on the base. A rotating shaft of the motor drives the pinion 145 to rotate. The pinion 145 is engaged with the rack 141. The pinion 145 drives the rack 141 to vertically reciprocate. The rack 141 is connected to the pull rod 144 via a connecting member, an upper end of the pull rod 144 is fixedly connected to the movable member 142, and the rack 141 drives the pull rod 144 to move upward or downward, so that the movable member 142 and the fixed member 143 are separated or joined, to enable the pylorus clamp head to tighten or loosen the pylorus 112. The degree to which the pylorus clamp 14 clamps the pylorus may be changed by adjusting the degree to which the movable member 142 is pressed downwardly.

As shown in FIG. 1 to FIG. 3, two rolling compression apparatuses 12 are disposed at two sides of the stomach body 111 of the bionic stomach 11. The two rolling compression apparatuses are symmetrically disposed with respect to the axis of symmetry of the stomach body 111. A clamping angle between sliding mechanisms of the two rolling compression apparatuses 12 may be adjusted as required. The clamping angle ranges from 0° to 10°. Specifically, the rolling compression apparatus includes a sliding mechanism 121, a retractable mechanism 122, and a roller 123. The roller 123 is connected to a movable end of the retractable mechanism 122. In the present application, the retractable mechanism 122 is a gas cylinder. A piston rod of the gas cylinder is connected to the roller 123. The sliding mechanism is mounted on the base. The sliding mechanism 121 includes a slide rail that is at a particular angle to the axis of symmetry of the stomach body 111. A slide groove is fixed at the bottom of the gas cylinder for slidably cooperating with the slide rail. The sliding mechanism 121 further includes a driving member and a transmission member. The driving member is connected to the gas cylinder via the transmission member. In the present application, the driving member is a motor, and the transmission member is a screw rod. The screw rod is in threaded fit with the gas cylinder. The driving member drives the gas cylinder and the roller 123 to reciprocate along the slide rail. The gas cylinder can push out and pull back the roller 123, such that the roller 123 is driven to perform rolling compression on the bionic stomach 11 along the slide rail to simulate the peristalsis of a human stomach.

A specific working procedure of the present application is as follows: A material is first added to the funnel. The first esophagus clamp 22 is opened, and the second esophagus clamp 23 is kept closed. The vibrator 24 is opened to allow food to enter the bionic esophagus 21. The vibrator 24 drives the bionic esophagus 21 to vibrate to simulate the peristalsis of an esophagus. When the food enters between the first esophagus clamp 22 and the second esophagus clamp 23, the first esophagus clamp 22 is closed, and the second esophagus clamp 23 is opened. At this time, the vibrator 24 is kept in a working state. The food enters the stomach body 111 through the bionic esophagus 21 and the cardia 113. The foregoing process is repeated until the amount of food meets a requirement. A particular amount of digestive fluid is injected into the stomach body 111 through the gastric juice tube 13 to simulate the gastric juice in a human stomach. When all the food has entered the stomach body 111, the gas cylinder pushes the roller 123 to compress the middle of the stomach body 111. The sliding mechanism 121 drives the gas cylinder to move towards the pylorus 112, to push the food to move towards one end of the pylorus 112 of the stomach to simulate the peristalsis of the stomach. The degree and frequency of opening and closing the pylorus clamp 14 are set. When the food reaches the pylorus 112 of the bionic stomach 11, if the pylorus clamp 14 is in an open state, the food leaves the bionic stomach 11, or otherwise the food returns to the front end of the bionic stomach 11. When the roller 123 runs to a specified position at one end of the pylorus 112 of the bionic stomach 11, the gas cylinder retracts, the sliding mechanism 121 drives the gas cylinder to move towards the front end of the stomach to an initial position, and the foregoing steps are repeated to compress the stomach until all the food in the bionic stomach 11 is discharged.

In the present application, food is added to the bionic esophagus 21 and the bionic stomach 11. The vibration and compression of a mechanical mechanism are used to simulate the peristalsis of an esophagus and a stomach of a human during the digestive activity, to further approximate the real digestive activity of a human. Furthermore, the bionic stomach 11 and the bionic esophagus 21 imitate the shape of a human stomach and a human esophagus, and an elastic rubber material is used, so that the bionic stomach 11 and the bionic esophagus 21 in the present application are respectively closer to a real human stomach and a real human esophagus. In this way, simulated digestion is more realistic and reliable. In the present application, the digestion of a human esophagus and stomach is simulated, so that the physical and chemical properties of food and drugs passing through a human esophagus and stomach can be evaluated realistically.

The above description is only preferred embodiments of the present invention and not intended to limit the present invention, it should be noted that those of ordinary skill in the art can further make various modifications and variations without departing from the technical principles of the present invention, and these modifications and variations also should be considered to be within the scope of protection of the present invention.

What is claimed is:

1. A bionic human esophagus and stomach digestive system, comprising a bionic stomach assembly, wherein the bionic stomach assembly comprises:
   a bionic stomach comprising a stomach body which is provided with a pylorus and a cardia thereon;
   a rolling compression apparatus, which is disposed outside the stomach body for performing rolling compression on the bionic stomach; and
   a gastric juice tube, which is in fluid communication with the stomach body.

2. The bionic human esophagus and stomach digestive system according to claim 1, wherein the bionic stomach assembly further comprises a pylorus clamp which is clamped on the pylorus for controlling the pylorus to be opened or closed.

3. The bionic human esophagus and stomach digestive system according to claim 2, wherein the pylorus clamp comprises a pylorus clamp head, the pylorus clamp head comprises a fixed member and a movable member respectively disposed at two sides of the pylorus, the fixed member is connected to a pull rod, and the pull rod may drive the movable member to move towards or away from the fixed member.

4. The bionic human esophagus and stomach digestive system according to claim 1, wherein there are two rolling compression apparatuses which are symmetrically disposed at two sides of the axis of symmetry of the bionic stomach, the rolling compression apparatus each comprises a horizontally disposed sliding mechanism, an angle between the sliding mechanisms of the two rolling compression apparatuses is 0° to 10°, a retractable mechanism is provided on and slidably fits with the sliding mechanism, the sliding mechanism may drive the retractable mechanism to reciprocate between the middle of the stomach body and the pylorus, the retractable mechanism comprises a movable end that is retractable relative to the stomach body, and an end portion of the movable end is connected to a roller.

5. The bionic human esophagus and stomach digestive system according to claim 1, wherein the system further comprises a stomach support disposed below the stomach body for supporting the stomach body.

6. The bionic human esophagus and stomach digestive system according to claim 1, wherein the system further comprises a bionic esophagus assembly connected to the bionic stomach assembly, the bionic esophagus assembly comprises:
 a bionic esophagus, which is in fluid communication with the cardia; and
 a first esophagus clamp and a second esophagus clamp, which are respectively clamped at two ends of the bionic esophagus for controlling the esophagus to be opened or closed; and
 a vibrator, which is disposed between the first esophagus clamp and the second esophagus clamp for driving the bionic esophagus to vibrate.

7. The bionic human esophagus and stomach digestive system according to claim 6, wherein the bionic esophagus is further connected to a feeding mechanism.

8. The bionic human esophagus and stomach digestive system according to claim 6, wherein the vibrator comprises a clamping plate for clamping the bionic esophagus, and the clamping plate is connected to a connecting rod which reciprocates in a horizontal plane.

9. The bionic human esophagus and stomach digestive system according to claim 6, wherein the bionic esophagus is made of an elastic material and the bionic stomach is made of an elastic material.

10. The bionic human esophagus and stomach digestive system according to claim 6, wherein an inner sleeve is disposed at a connection between the bionic esophagus and the bionic stomach, the cardia is sleeved on one end of the inner sleeve, and the bionic esophagus is sleeved on the other end of the inner sleeve.

* * * * *